Figure 1:
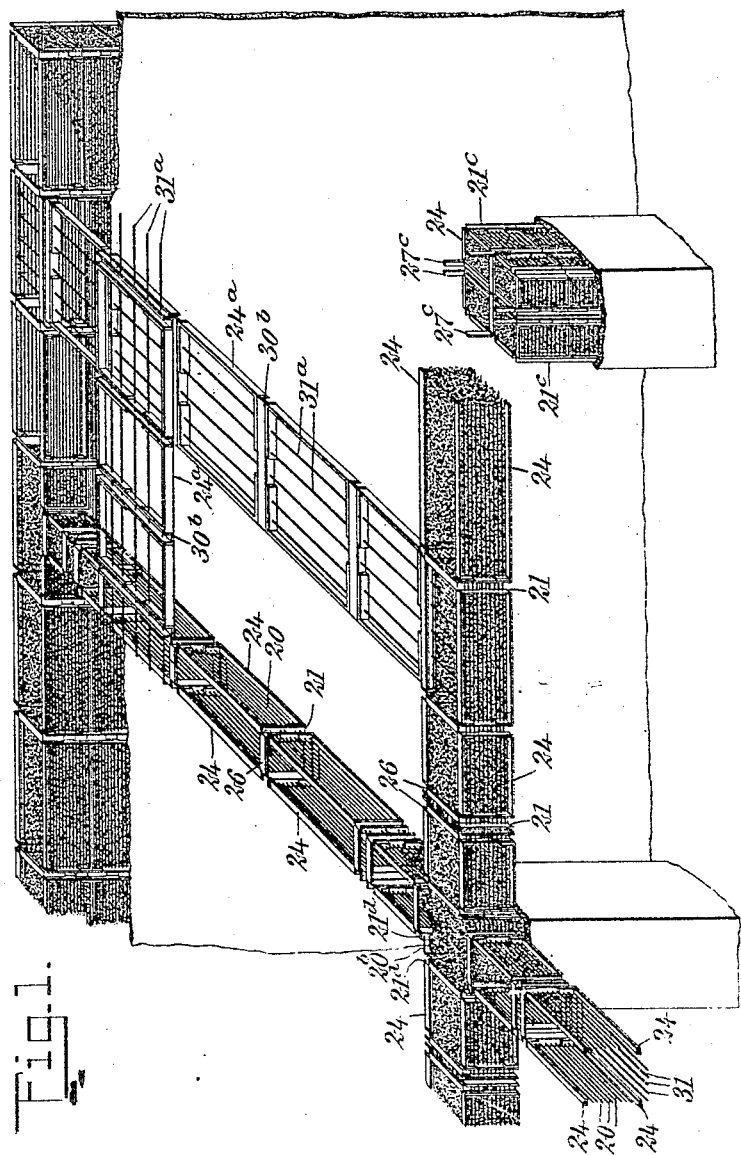

J. W. MULDOON.
COLUMN, GIRDER, AND THE LIKE.
APPLICATION FILED APR. 30, 1908.

914,861.

Patented Mar. 9, 1909.
5 SHEETS—SHEET 1.

WITNESSES
L. Almquist
C. W. Fairbank

INVENTOR
John W. Muldoon
BY
ATTORNEYS

J. W. MULDOON.
COLUMN, GIRDER, AND THE LIKE.
APPLICATION FILED APR. 30, 1908.
914,861.
Patented Mar. 9, 1909.
5 SHEETS—SHEET 2.
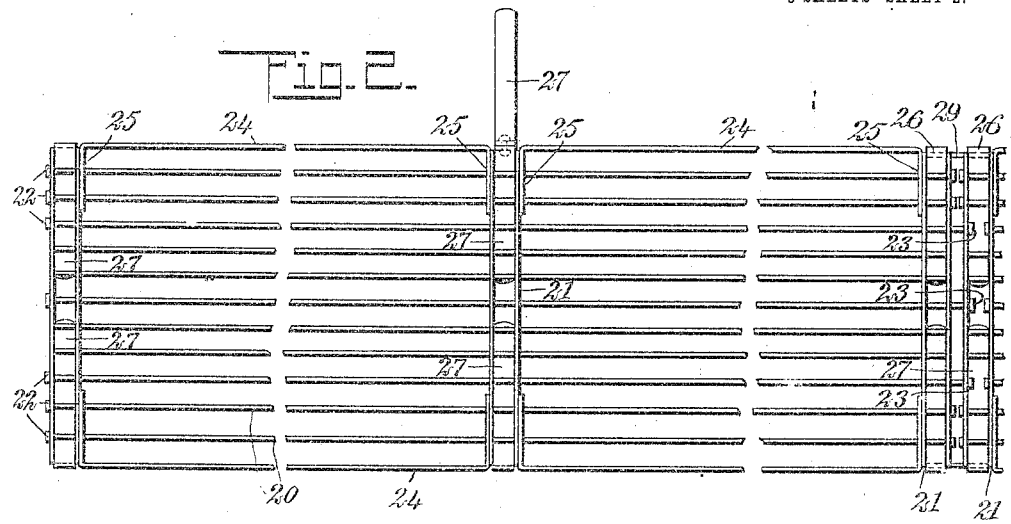
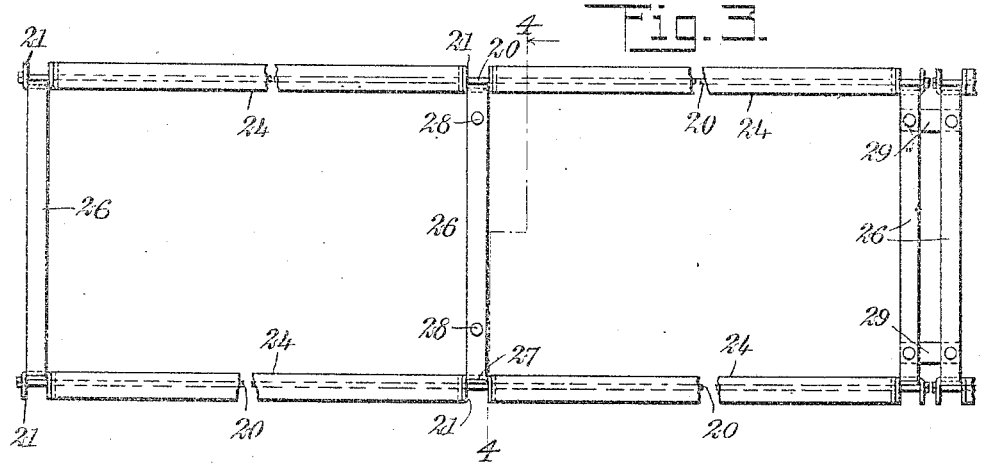
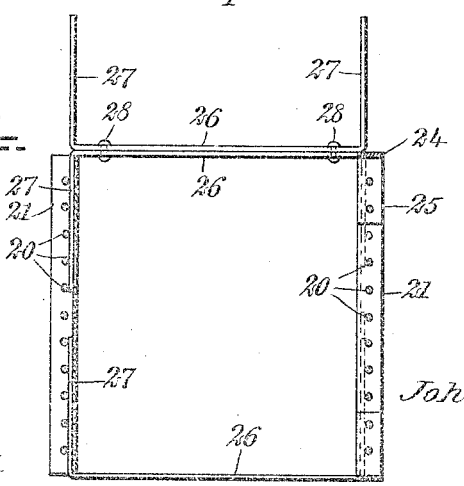
WITNESSES
L. Almquist
C. W. Fairbank
INVENTOR
John W. Muldoon
BY
Munn & Co
ATTORNEYS

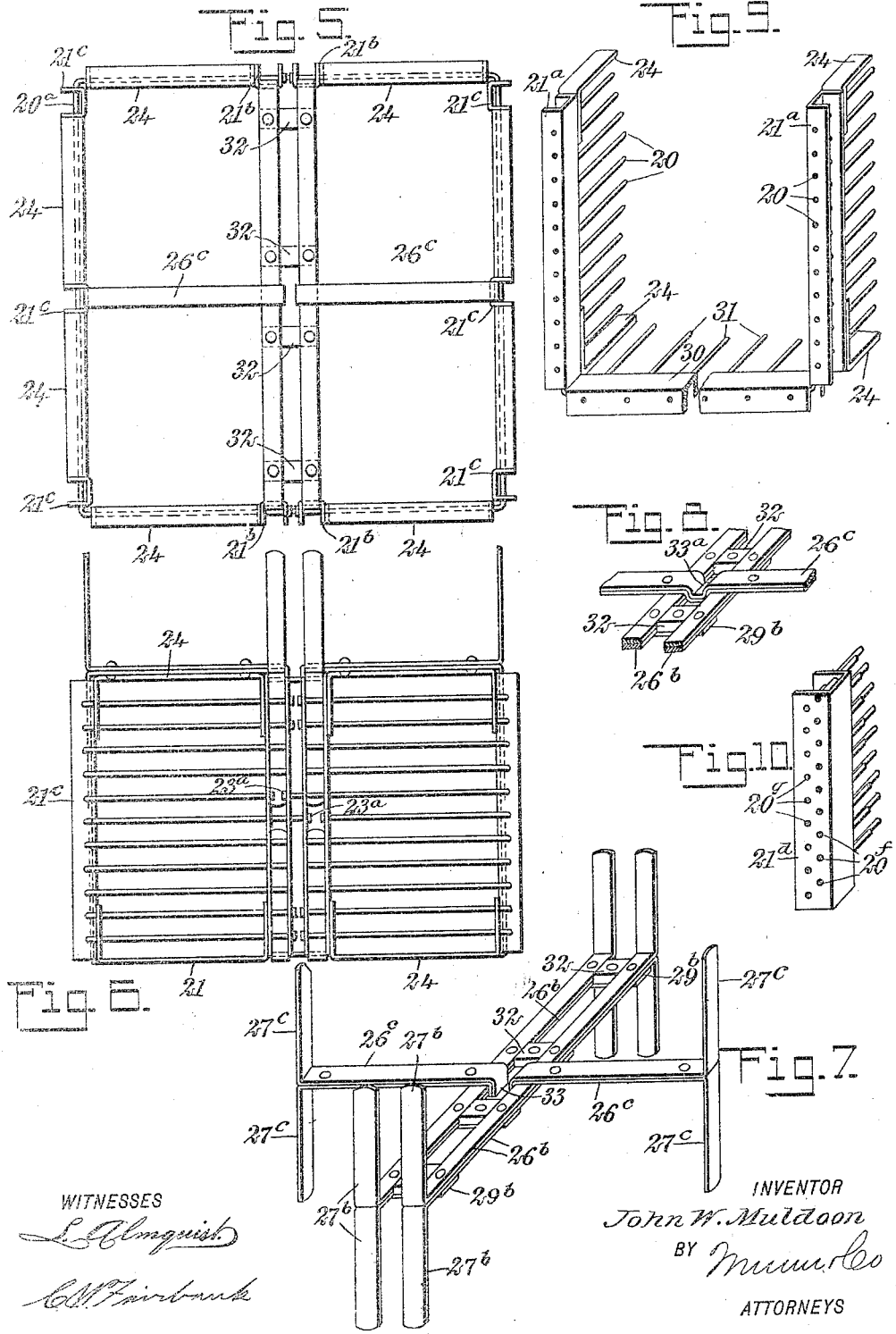

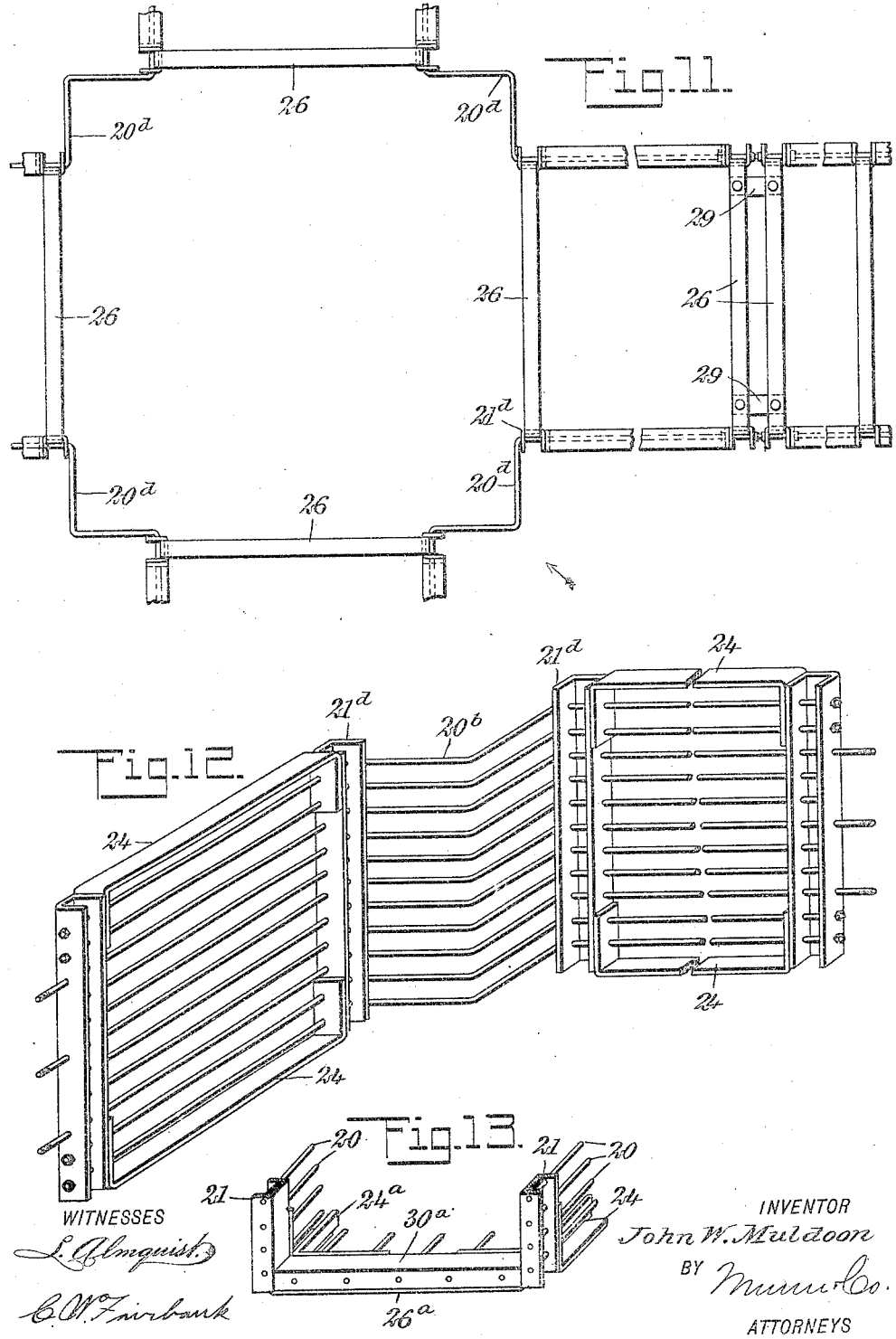

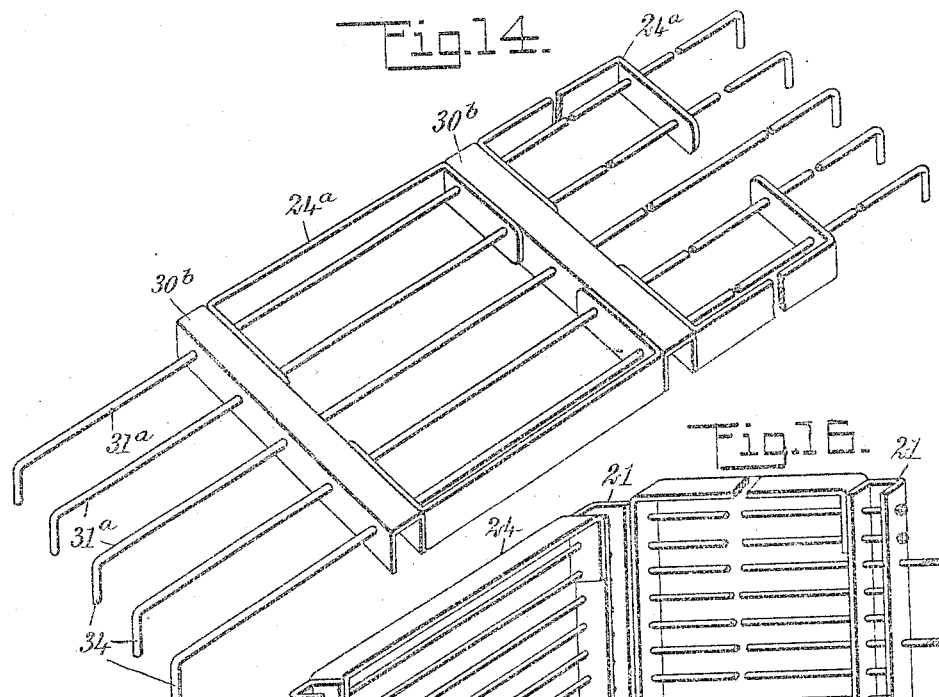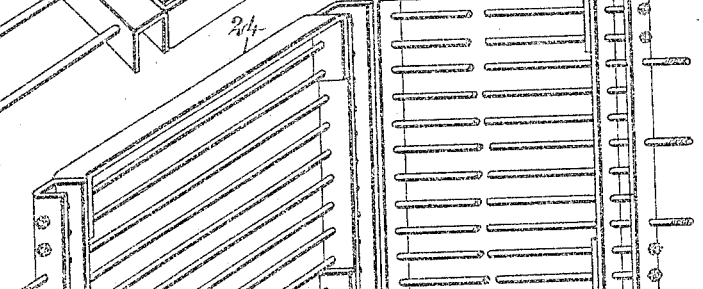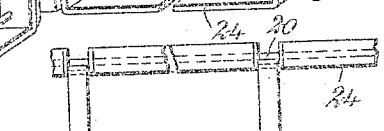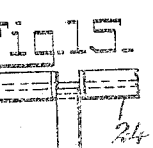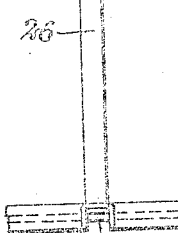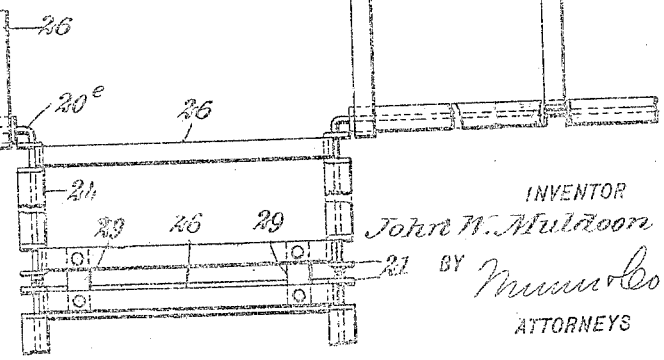

UNITED STATES PATENT OFFICE.

JOHN W. MULDOON, OF NEW YORK, N. Y.

COLUMN, GIRDER, AND THE LIKE.

No. 914,861.    Specification of Letters Patent.    Patented March 9, 1909.

Application filed April 30, 1908. Serial No. 430,037.

*To all whom it may concern:*

Be it known that I, JOHN W. MULDOON, a citizen of the United States, and a resident of the city of New York, borough of Manhattan, in the county and State of New York, have invented new and useful Improvements in Columns, Girders, and the Like, of which the following is a full, clear, and exact description.

This invention relates to certain improvements in reinforced concrete construction particularly adapted for the formation of columns, girders, walls and the like, and relates more particularly to that type of construction disclosed and claimed in my previous patent No. 874,226, issued December 17, 1907. In this type of construction, I utilize a metallic reinforcement of such a character that it serves the double purpose of holding the concrete in position while it is hardening, and serves as a reinforcement for the concrete after it has hardened. I eliminate all wooden forms or other supporting means, and utilize the reinforcement as a permanent form. In the construction illustrated in my previous patent above referred to, I employ reticulated metal baskets formed of wire netting or wire gauze, held in position by a framework of rods or bars. In the present construction, I form the reticulated metal baskets of a plurality of rods supported closely adjacent each other and held substantially parallel by spacing members extending transversely of the rods. The rods are sufficiently close together to prevent the escape of any material quantity of concrete or cement therebetween, and serve to present a roughened outer surface to which a finishing coat will readily adhere, so as to give the structure a smooth surface and conceal and protect the reinforcement. I also provide certain improvements in the means for spacing the rods in their parallel positions, and the means for holding the baskets or containers in vertical alinement during the building of a wall or girder, and in the formation of the reinforcement for the floors of adjacent walls or girders.

Reference is to be had to the accompanying drawings, forming a part of this specification, in which similar characters of reference indicate corresponding parts in all the figures, and in which—

Figure 1 is a perspective view of a portion of a structure built up in accordance with my invention; Fig. 2 is a side elevation of a basket or container adapted for use in the formation of a wall; Fig. 3 is a top plan view of the structure shown in Fig. 2; Fig. 4 is a transverse section on the line 4—4 of Fig. 3; Fig. 5 is a top plan view of a basket or container adapted for use in the formation of a column; Fig. 6 is a side elevation of the construction shown in Fig. 5; Fig. 7 is a perspective view of bracing means for holding in vertical alinement superimposed baskets or containers of the type shown in Figs. 5 and 6; Fig. 8 is a detail showing a slight modification of the construction shown in Fig. 7; Fig. 9 is a perspective view of a portion of a container adapted for use in the formation of girders; Fig. 10 is a perspective view of a portion of a container having double layers of connecting rods; Fig. 11 is a top plan view of a basket or container adapted for use in connecting a column and girder; Fig. 12 is a perspective view of the construction employed in the formation of a corner of a column and two adjacent girders, said view being taken substantially in the direction of the arrow on Fig. 11; Fig. 13 is a perspective view showing a slightly modified form of container for the formation of girders; Fig. 14 is a perspective view of a reinforcement adapted for use in the formation of floors; Fig. 15 is a top plan view of the reinforcement used in the formation of intersecting walls or intersecting columns and walls; and Fig. 16 is a perspective view of a portion of the structure in Fig. 15.

In the specific form of reinforcement and retaining means, I employ containers each formed of a plurality of rods arranged parallel and held in their spaced relationship by channel members, which channel members are held in their spaced relationship by longitudinally-disposed members and held in vertical alinement by suitable connecting members. In the formation of a wall, I provide substantially the construction illustrated in Figs. 2, 3 and 4. The specific container herein illustrated comprises two oppositely-disposed substantially parallel walls detachably connected together by transverse members, which also serve for holding superimposed containers in vertical alinement. Each wall is formed of a plurality of small rods 20 of any suitable length and held rigidly by vertically-disposed channels or channel members 21. The rods extend through the flanges of the channels parallel to the web of the channel but spaced a short distance from said web. Any desired number of rods may be employed, depending upon the height of the container, but the rods are disposed at such a distance apart that they serve to retain the concrete. The rods are so close together that none of the broken stone or gravel of the concrete can pass through, the only part which does pass through being a small quantity of the cement, and this serves to engage with the outer surface of the rods to effectively bind them to the body of the concrete after the latter has hardened.

Any number of channel members desired may be employed for holding the rods substantially rigid and preventing their distortion. All of the rods pass through both flanges of each of the channels which are arranged intermediate the ends of the wall sections, but at the ends of the wall sections, certain of the rods pass through only one of the flanges of the terminal channel and abut against the inner surface of the outer flange of the channel. The remaining rods extend through both flanges and are provided with terminal nuts 22, or with any other suitable fastening means for holding the parts in their assembled relationship. Where two containers come end to end, one or more of the rods may be made of such length that they will extend through both flanges of the terminal channel member and also through one flange of the channel member of the next adjacent wall section, to be retained therein by suitable nuts 23, as indicated at the right end of Fig. 2. The channel members are spaced apart at regular distances and are held in their spaced relationship by suitable longitudinally-disposed connecting members. As shown, these members 24 are formed of metal strips in strap form, having their ends bent at substantially right angles to form terminal flanges 25. These spacing members are disposed along the upper and lower edges of each wall section, so as to form flat supporting surfaces and to space the channels at both ends. The flanges 25 of the spacing members extend alongside the outer surfaces of the channels and are of such length that one or more of the rods 20 pass therethrough. The rods hold the spacing members in position, the spacing members hold the channels in position, and the nuts or other fastening means 22 and 23 on the ends of the rods hold the entire wall section in assembled relationship. The side wall sections may be made up in any desired length or height, independently of the thickness of the wall to be formed.

In assembling the containers at the point at which they are to be used, two oppositely-disposed side wall sections are held at the desired distance apart and substantially rigid in respect to each other by transverse tie bars. Each tie bar 26 comprises a simple piece of strap metal having terminal flanges 27 of a width substantially equal to the distance between the flanges of the channels and adapted for insertion between the web of a channel and the rods 20 extending thereto. The flanges fit tightly in place, hold the side wall sections at definite and predetermined distances apart, and by reason of their width and the binding action within the channels, hold the side wall sections against skewing. If desired, two of the transverse tie bars 26 may be placed back to back and rigidly secured together in any suitable manner, as, for instance, by rivets 28. The transverse tie bars will then serve not only to hold the wall sections together, but will also serve to hold superimposed wall sections in vertical alinement, as the flanges 27 of one tie bar would be in alinement with and extending in the opposite direction from the flanges 27 of the adjacent tie bar. In practice, a majority of the tie bars would be in the simple form, but one or more of the double tie bars would be used in connection with each container or basket for holding the side walls in vertical alinement. If desired, two tie bars may be connected together by suitable links 29, as illustrated at the right-hand end of Figs. 2 and 3. These links in connecting the adjacent tie bars would serve to prevent the longitudinal separation of two containers placed end to end and act in addition to the nuts 23 of the longer rods.

The container above described and illustrated in Figs. 2, 3 and 4, is especially adapted for use in the formation of walls, but by making slight changes, the basket or container may also be employed in the formation of girders. It is only necessary to provide a bottom for the container or reinforcement for the lower portion of the concrete of the girder.

In Fig. 9, I have illustrated a portion of a container especially adapted for use in the formation of girders. In this container, I provide a channel member 30 integral with the two oppositely-disposed vertically-extending channel members 21ª of the two side wall sections. At the intersection of the channel member 30 and the two side channel members 21ª, the flanges are cut to permit the webs to be bent to substantially a right angle. The side wall sections, save for being integral with the bottom, are formed the same as the side wall sections shown in Figs. 2, 3 and 4. The channels serve to support the rods 20 and the channels are spaced apart by the longitudinally-disposed members 24. The channel members 30 of the bottom serve to support a plurality of longitudinally-extending rods 31, spaced apart the desired distance to provide the necessary reinforcement for tension, but they are not so close together as to prevent the passage of concrete therethrough. In building girders, I preferably do not rely entirely upon the rods 31 to retain the concrete in place, but provide a platform or scaffolding of bars a short distance below the rods 31, and brace the platform or scaffolding to support the weight of the concrete while it is hardening.

The opposite wall sections of the containers shown in Figs. 2, 3 and 4, may be readily taken apart and shipped in the knockdown condition, but the container shown in Fig. 9 cannot as readily be taken apart, due to the integrality of the channels $21^a$ and 30. If desired, the channel member of the bottom may be made separate from the side channel member so as to permit of their being readily separated, as shown in Fig. 13. Here I provide a transverse channel member $30^a$ at the bottom, and secure it to the side channel members 21 by a transverse tie bar $26^a$, the ends of which extend upwardly between the webs of the channels 21 and adjacent portions of the rods 20. The channel members 21 are spaced apart by the customary spacing member 24, and the bottom channels $30^a$ may be spaced apart by smaller longitudinally-disposed members $24^a$.

In the containers used for forming the girders and the walls, it is not necessary to provide ends, except at the corners of the building or at an angle in the wall, but for forming columns, it is necessary that containers or baskets be provided having outer peripheral walls of a form dependent upon the particular form of the column to be built. In Figs. 5 and 6, I have illustrated a container especially adapted for use in the formation of columns. The container is made up of two separate wall sections detachably secured together by suitable bracing tie rods, but the elements going to make up the container are substantially the same as those previously described.

In forming a column rectangular in cross section, each of the two wall sections forms one side of the container and one-half of each of the other two sides. The rods $20^a$ are secured to vertical channels $21^b$ at the ends of the rods, said channels being disposed intermediate the ends of opposite sides of the column. The rods are also spaced apart by channels $21^c$ at the corners of the column, and intermediate the ends of the connecting side, and the channels are spaced apart by the usual spacing bars 24. For securing the two wall sections together to form the column, I provide a tie bar structure, which also serves to connect opposite sides of the column. As shown more clearly in Fig. 7, this tie bar structure is made up of a plurality of bars of strap iron, each terminating in a flange adapted for insertion within a channel. Two bars $26^b$ are riveted with their backs together, for connecting the two channels $21^b$ of one wall section, and a second pair of tie bars $26^b$ are secured together for connecting the channels $21^b$ of the other wall section. These two pairs of bars are rigidly secured together by links $29^b$ and are spaced apart by interposed blocks 32. As the bars are connected together, the terminal flanges $27^b$ are held rigid in respect to each other and connected to different wall sections to hold the latter together. Additional tie bars $26^c$ are preferably provided, each terminating in a flange $27^c$ for engagement in the center channels $21^c$, and preventing the sides of the wall sections from spreading apart under the weight of the concrete. Each tie bar $26^c$ may terminate in a flange 33 hooked into the tie bar $26^b$, as shown in Fig. 7, or the two tie bars $26^c$ may be integral with each other and have a central depressed portion $33^a$ disposed intermediate the two tie rods $26^b$ substantially as shown in Fig. 8. This tie bar or brace structure curves to hold the containers in vertical alinement to hold the two wall sections of each container together at their meeting edges and to prevent the wall sections from spreading intermediate their edges. The wall sections may also be held together by forming certain of the rods slightly longer than the remainder and extending them through beyond the channels $21^b$ of their own wall section and into the channels $21^b$ of the adjacent section. The ends of these rods may be provided with any suitable fastening means, as for instance, nuts $23^a$.

At the upper end of a column or at any other place at which the column is to be connected to a girder, a special container is provided, the side wall sections of which form portions of the column and also portions of the girder. As shown in Figs. 11 and 12, four separate wall sections are provided, each forming one side of each of two adjacent girders and also the connecting corner of the column. Each wall section is formed of two wall sections substantially of the type shown in Figs. 2, 3 and 4, but the rods $20^b$ thereof are bent at substantially right angles from one of the upright channels $21^d$, to form a portion of the column wall and then again bent at right angles to form a portion of the adjacent side of the column wall, and are a third time bent at right angles to pass through the channel $21^d$ of a second girder at right angles to the first-mentioned girder. The channels are spaced apart by the longitudinally-disposed spacing members 24, and are connected by the tie bars $26$, as in the other containers previously described. In connecting a girder to a wall, or in forming two walls intersecting at an angle, I provide the containers shown in Figs. 15 and 16. A wall section is here employed, which is formed of two wall sections of the type shown in Figs. 2, 3 and 4, and arranged at the desired angle to each other. The rods 20ᵉ of one side wall section are bent at the desired angle and constitute the rods of the side wall section of the intersecting concrete girder or partition wall.

In forming the reinforcement for floors, I utilize substantially the same elements as I do in forming columns, girders and walls. In Fig. 14, I have illustrated a reinforcement for floors formed of a plurality of rods 31ᵃ extending through the flanges of channels 30ᵇ, and the channels are spaced apart and held parallel by longitudinally-disposed bars 24ᵃ of strap iron. In forming a floor, I provide a plurality of reinforcement sections as shown in Fig. 14, each section being of a width convenient to handle and having the rods 31ᵃ of a length sufficient to extend from the outer surface of one wall or girder to the opposite side of the adjacent wall or girder. The ends of the rods 31ᵃ are extended beneath the longitudinally-disposed bars 24 of the walls or girders between which the floor is to extend, and the ends of the rods 31ᵃ are provided with downturned terminal portions 34, which are disposed adjacent the outer surface of the rods of the wall sections. A plurality of these floor reinforcements are provided adjacent each other to cover the area in which the floor is to be formed, and the flanges of the channels are preferably extended downwardly. In order to resist the strain in all directions, I preferably place the floor reinforcements in two layers, the second layer of reinforcement sections being extended at right angles to the first layer of sections and with the flanges of the channels extending upwardly. The bars 31ᵃ are not necessarily so close together as to prevent the passage of concrete therethrough, as I preferably provide a temporary platform or support beneath the reinforcement to hold up the concrete while it is hardening.

The rods forming the sides of the container may be of any size desired, dependent upon the amount of reinforcement necessary and the plasticity of the concrete to be employed. If desired, each wall section may be made up of a plurality of successive layers of rods, the rods of one layer being arranged zigzag to the rods of the next layer, as shown in Fig. 10. The inner row of rods 20ᶠ may, if desired, be further apart and of larger size than the outer series of rods 20ᵍ. The inner series of rods would prevent the passage of the coarser portions of the concrete therethrough and the outer series of rods would resist the passage of the finer portion of the concrete or cement.

It is understood that where the structure, particularly the girders, is to sustain great wear and more than ordinary reinforcement is necessary to resist the tension, I may utilize in the containers for the girders any well-known type of reinforcing bar, but the use of such bars would not affect the construction, operation, or advantages of my improved system hereinabove described. At the time the concrete is placed in the containers, the small portion of cement escaping between the adjacent rods may be smoothed with a trowel to provide a finishing coat and to entirely conceal the wall sections of the containers, or, if desired, the cement may be left in ridges between the rods until after it has hardened, and an outer finishing layer of cement or mortar applied to the outside to form a smooth surface. This coating will be firmly held in place by reason of the rough nature of the exposed surface of the reinforcement and the ridges of concrete extending outwardly between the rods thereof.

Having thus described my invention, I claim as new and desire to secure by Letters Patent:

1. A reinforced concrete column having the reinforcement thereof in the form of a tubular structure and comprising a plurality of horizontally-disposed parallel rods lying closely adjacent each other and adjacent the surface of the column and serving to retain the concrete in position during the hardening and reinforce the concrete after the hardening, a plurality of vertically-disposed members having engagement with each of said rods for holding the latter in spaced relationship, and members extending longitudinally of said rods and engaging with said first-mentioned members for holding the latter in spaced relationship.

2. A reinforced concrete structure having the reinforcement thereof formed of a plurality of superimposed containers, each adapted to be filled with concrete in the formation of the structure, and having the side walls thereof formed of a plurality of horizontally-disposed rods closely adjacent each other, and vertically-disposed channel members in engagement with each of said rods for holding them in spaced relationship.

3. A reinforced concrete column having the reinforcement thereof in the form of a tubular structure and comprising a plurality of horizontally-disposed parallel rods disposed closely adjacent each other and adjacent the surface of the column, channel members extending transversely of the rods and serving to hold said rods in spaced relationship, and members extending longitudinally of said rods and engaging with said channel members for holding the latter in spaced relationship.

4. A reinforced concrete structure having the reinforcement thereof formed of a plurality of superimposed containers, each container having the side walls thereof formed of a plurality of substantially parallel rods closely adjacent each other, means for holding said rods in spaced relationship, and means for holding said containers in vertical alinement, the concrete within said containers being held in place during the hardening by said rods, said rods serving as reinforcement after the concrete has hardened, and the mass of concrete within each container being integral with the concrete in the remaining containers.

5. A container adapted to be filled with concrete in the formation of concrete structures, having the side walls thereof formed of a plurality of parallel rods disposed closely adjacent each other and serving to retain the concrete during the hardening and reinforcing the concrete after the hardening, and channel members having the flanges thereof provided with apertures said rods being passed through said apertures and being thereby held in spaced relationship.

6. A container adapted to be filled with concrete in the formation of concrete structures, having the side walls thereof formed of a plurality of parallel rods disposed closely adjacent each other and serving to retain the concrete during the hardening and reinforcing the concrete after the hardening, members angular in cross section and extending transversely of said rods and holding said rods in spaced relationship and spacing members extending longitudinally of said rods and in engagement with said members and holding the latter in spaced relationship.

7. A container adapted to be filled with concrete in the formation of concrete structures, having the side walls thereof formed of a plurality of parallel horizontally-disposed rods closely adjacent each other, and vertically-disposed channel members having apertures in the flanges thereof and through which said rods extend.

8. A container adapted to be filled with concrete in the formation of concrete structures, having the side walls thereof formed of a plurality of parallel horizontally disposed rods closely adjacent each other, vertically-disposed channel members having apertures in the flanges thereof through which said rods extend, and means adapted for engagement with the ends of the channels of adjacent containers for holding them in vertical alinement.

9. A container adapted to be filled with concrete in the formation of concrete structures, having the side walls thereof formed of a plurality of parallel horizontally-disposed rods closely adjacent each other, vertically-disposed channel members having apertures in the flanges thereof through which said rods extend, and means extending transversely of said channels intermediate the ends thereof, for preventing the spreading of the opposite sides of the container and having terminating portions for engagement in the channels of adjacent containers for holding the latter in vertical alinement.

10. A container adapted to be filled with concrete in the formation of concrete structures, having the side walls thereof formed of a plurality of parallel horizontally-disposed rods closely adjacent each other, vertically-disposed channel members having apertures in the flanges thereof through which said rods extend, and a bar extending transversely of the container intermediate the ends thereof, and having downturned flanges for engagement with the channels of one container and upturned terminal flanges for engagement in the channels of a superimposed container.

11. A container adapted to be filled with concrete in the formation of concrete structures, having the side walls thereof formed of channel members, and a plurality of parallel rows of parallel rods disposed closely adjacent each other and supported and spaced by said channel members and serving to retain the concrete in position during the hardening.

12. A container adapted to be filled with concrete during the formation of concrete structures, having the side walls thereof formed of a plurality of horizontally-disposed rods closely adjacent each other and vertically-disposed channel members holding said rods in spaced relationship, and means for connecting the opposite sides of said container adjacent the ends thereof, said means also having means for holding two containers in alinement.

13. A reinforcement for use in the formation of concrete structures, comprising a plurality of parallel rods, a plurality of channel members extending transversely of said rods and having apertures in the flanges thereof through which said rods extend to hold the latter in spaced relationship, and a plurality of members extending transversely of said rods and having engagement with said channels for holding the latter in spaced relationship.

In testimony whereof I have signed my name to this specification in the presence of two subscribing witnesses.

JOHN W. MULDOON.

Witnesses:
CLAIR W. FAIRBANK,
EVERARD B. MARSHALL.